(12) United States Patent
Künzel et al.

(10) Patent No.: US 8,729,845 B2
(45) Date of Patent: May 20, 2014

(54) METHOD AND DEVICE FOR CONTROLLING AN ELECTRIC MOTOR

(75) Inventors: Stefan Künzel, Erlangen (DE); Nico Spieckermann, Ludwigsburg (DE)

(73) Assignee: Siemens Aktiengesellschaft, München (DE)

( * ) Notice: Subject to any disclaimer, the term of this patent is extended or adjusted under 35 U.S.C. 154(b) by 254 days.

(21) Appl. No.: 13/406,032

(22) Filed: Feb. 27, 2012

(65) Prior Publication Data

US 2012/0217917 A1 Aug. 30, 2012

(30) Foreign Application Priority Data

Feb. 25, 2011 (DE) .......................... 10 2011 004 761
Nov. 2, 2011 (DE) .......................... 10 2011 085 551

(51) Int. Cl.
*H02P 6/06* (2006.01)
*H02P 6/08* (2006.01)

(52) U.S. Cl.
USPC ...... 318/400.35; 318/615; 318/667; 324/160; 324/161; 388/825; 388/833; 388/923; 388/930

(58) Field of Classification Search
USPC ............. 318/400.32, 615, 667; 324/160–180; 361/236–244; 388/800–824, 923–934, 388/842–847; 173/5
See application file for complete search history.

(56) References Cited

U.S. PATENT DOCUMENTS

| | | | | | |
|---|---|---|---|---|---|
| 4,509,126 | A | * | 4/1985 | Olig et al. ..................... | 700/173 |
| 5,543,695 | A | * | 8/1996 | Culp et al. ..................... | 318/432 |
| 5,998,957 | A | * | 12/1999 | Tadmor et al. ................ | 318/701 |
| 6,069,467 | A | * | 5/2000 | Jansen .......................... | 318/802 |
| 2011/0186318 | A1 | * | 8/2011 | Ichikawa ....................... | 173/176 |

* cited by examiner

*Primary Examiner* — Rita Leykin
(74) *Attorney, Agent, or Firm* — Henry M Feiereisen LLC

(57) ABSTRACT

A method and device for controlling an electric motor, in particular a machine tool drive, wherein during a sensorless open-loop control mode of operation of the electric motor the speed and the torque are determined from the motor current and the motor voltage, and the moment of inertia of the electric motor torque are determined from the determined motor current and the determined motor voltage, wherefrom then a control torque is determined, which is then associated with an open-loop torque control value and supplied as the torque setpoint value to a control element for setting the motor current and/or the motor voltage in the open-loop mode of operation. As long as the speed is below a minimum speed, the control element receives as input variable a control or pilot control torque generated from a predefined moment of inertia for a sensorless closed-loop control mode of operation of the electric motor.

12 Claims, 1 Drawing Sheet

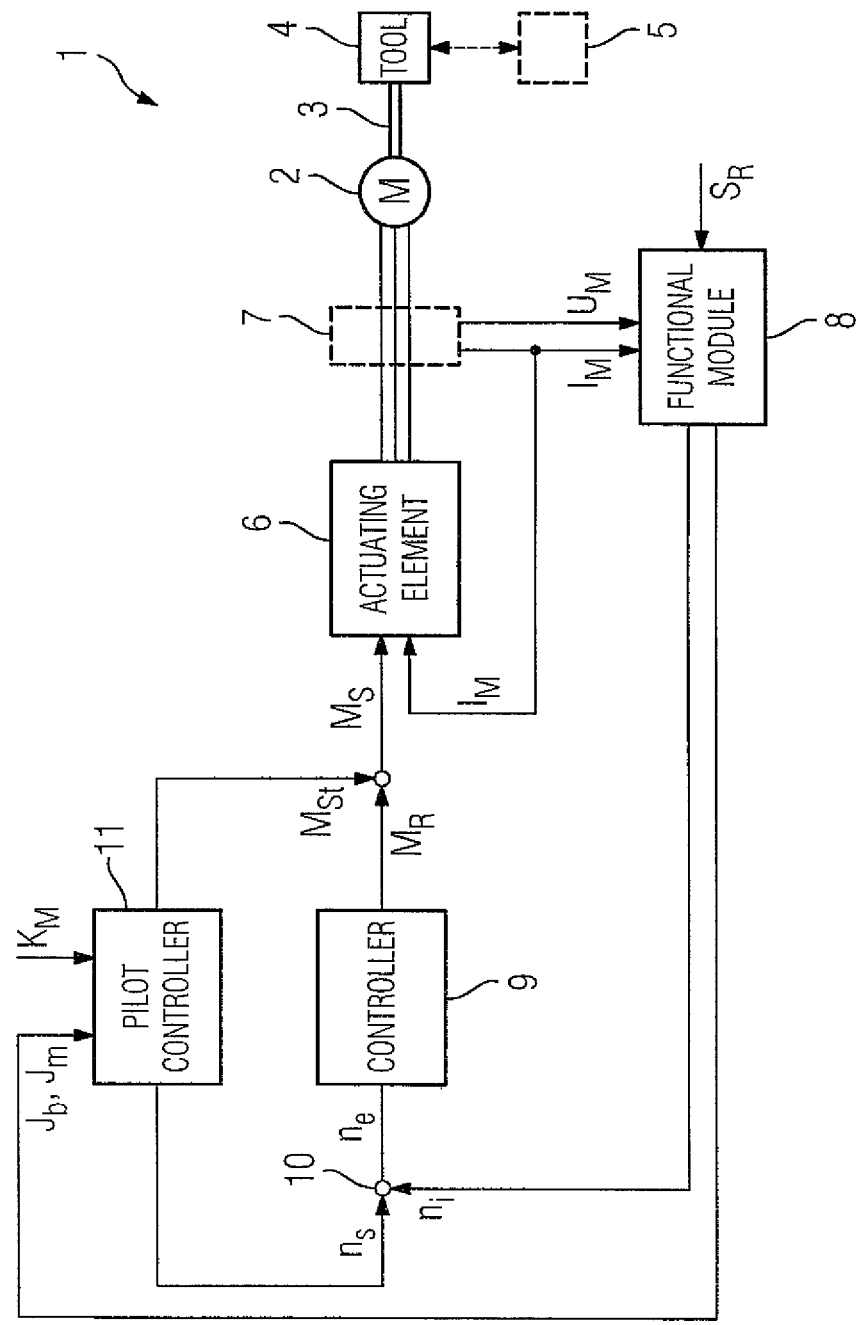

METHOD AND DEVICE FOR CONTROLLING AN ELECTRIC MOTOR

CROSS-REFERENCES TO RELATED APPLICATIONS

This application claims the priorities of German Patent Applications, Serial No. 10 2011 004 761.1, filed Feb. 25, 2011, and Serial No. 10 2011 085 551.3, filed Nov. 2, 2011, pursuant to 35 U.S.C. 119(a)-(d), the contents of which are incorporated herein by reference in their entirety as if fully set forth herein.

BACKGROUND OF THE INVENTION

The present invention relates to a method and a device for controlling a sensorless electric motor, in particular a machine tool drive. The method and device find applications in technical fields in which machine tools are driven by an electric motor.

The following discussion of related art is provided to assist the reader in understanding the advantages of the invention, and is not to be construed as an admission that this related art is prior art to this invention.

Sensorless operation of an electric motor, in other words operation of an electric motor without a rotational speed sensor, is of considerable importance in many applications for driving machine tools. Reasons for this are firstly cost savings and secondly the reliability of the drives, since without speed sensors no failures induced thereby can be caused either.

A sensorless electric motor that is used within a drive, in particular a machine tool drive, is driven in a open-loop control mode of operation in the lower speed range, for example within a speed range of approximately 10% of the rated speed. The reason for this is that in this range the motor model cannot provide an actual value for the speed, which value is required in order to regulate the electric motor. If the electric motor is accelerated or decelerated during sensorless operation with an excessively high change in frequency or an excessively high speed stroke, there is a risk that the electric motor will "buck". The term "bucking" of an electric motor means in this context that the electric motor is unable to follow the change in frequency or the required speed stroke and as a result has reached a maximum permitted slip value, for which reason the torque of the electric motor collapses abruptly. The consequence of this is that the electric motor no longer accelerates or no longer delivers a torque required for the drive.

If, on the other hand, the electric motor is accelerated or decelerated with a correspondingly low change in frequency or a correspondingly low speed stroke, time available for accelerating and decelerating would not be used.

It would therefore be desirable and advantageous to obviate prior art shortcomings and to provide an improved to method for controlling an electric motor which is used in particular in a machine tool drive and which enables the electric motor to accelerate or decelerate in a maximally time-saving manner. A further object is to disclose a corresponding device for performing the method.

SUMMARY OF THE INVENTION

According to one aspect of the present invention, a method for controlling a sensorless electric motor includes measuring a motor current and a motor voltage during a sensorless open-loop control mode of operation of the motor, determining a speed and a torque of the electric motor from the measured motor current and the measured motor voltage, computing a moment of inertia of the electric motor and determining a control torque from the calculated moment of inertia, associating the control torque with a torque control value determined by a controller from a speed deviation from a speed setpoint value, and supplying the control torque as a torque setpoint value to a control element for setting the motor current or the motor voltage.

In a sensorless open-loop control mode of operation, the control element receives as an input variable a control torque generated from a predefined moment of inertia, as long as the speed of the electric motor is below a minimum speed.

According to an advantageous embodiment of the present invention, the motor current and the motor voltage can be measured during a sensorless open-loop control mode of operation of the electric motor and the speed and torque of the electric motor can be calculated therefrom. Based on the relation $$J = \frac{M}{2\pi \cdot dn/dt}$$

or $$2\pi \cdot J \cdot \int_{n0}^{n1} dn = \int_{t0}^{t1} M \cdot dt$$

the moment of inertia J of the electric motor is calculated on the basis of the torque M and a control torque is determined from the calculated moment of inertia. The control torque is combined with a torque control value determined by a controller from a speed deviation from a speed setpoint value and supplied as a torque setpoint value to a control element for the purpose of adjusting the motor current or the motor voltage.

While the speed of the electric motor is below a minimum speed, for example during startup or running up to speed of the electric motor from standstill up to such a speed (minimum speed) at which the regulator supplies a actual speed value, the control element receives a control or pilot control torque generated from a predefined moment of inertia as the input variable. This is equivalent to the sensorless closed-loop operation.

The invention is based on the consideration that the change in frequency or the speed stroke with which the electric motor can be accelerated or decelerated can be derived from the knowledge of the moment of inertia of the electric motor or of the drive, without causing bucking of the electric motor. In order to avoid bucking of the electric motor during its controlled acceleration or deceleration, the maximum settable change in frequency or speed, i.e. the maximum permitted speed acceleration of the electric motor, should be aligned with the moment of inertia of the electric motor or the drive.

In the open-loop control mode of operation of the electric motor in which a closed-loop control mode of operation is not possible due to the absence of information relating to the speed or actual torque value, a maximum moment of inertia for adjusting the motor current or the motor voltage is suitably specified to the control element.

According to an advantageous embodiment of the present invention, a fixed value for the speed acceleration (speed stroke) for the greatest occurring moment of inertia may be set and the electric motor may always be accelerated and decelerated with this speed acceleration value. Then, however, the electric motor would tend toward undershooting in response to setpoint changes, in particular during the open-loop operation. This would lead to an undesirably time-intensive acceleration or deceleration of the electric motor if the actual moment of inertia is significantly less than the permanently set moment of inertia. Furthermore this can lead to problems with motor spindles which are fitted with alternate tools having different inertia and consequently have different maximum speed accelerations.

According to another advantageous embodiment of the present invention, a plurality of data records in which specific moments of inertia are stored for all the tools may be created, which may be selected on a tool-specific basis. However, this requires an additional data memory for storing the plurality of data records of moments of inertia and consequently leads to an undesirable extra investment in resources as well as to commensurate additional costs.

The invention is based on the observation that the maximum speed change during acceleration or deceleration of the electric motor should always be selected as a function of the moment of inertia of the electric motor including the mounted tool so that the electric motor can be accelerated and decelerated without undershoot behavior or bucking.

According to another advantageous embodiment of the present invention, a particularly suitable method for controlling an electric motor of a machine tool drive may therefore be provided in which the electric motor is started up in the sensorless closed-loop control mode of operation and accelerated up to the minimum speed, which is equivalent, for example, to approximately 10% of the rated speed. During said closed-loop control mode of operation recourse is made to a control or pilot control torque output by a pilot controller on the basis of the preferably maximum moment of inertia and from said torque value the motor current is set by the actuating element.

Once the minimum speed is reached or exceeded, the sensorless open-loop control mode of operation is possible and a control torque is determined from the moment of inertia calculated during the open-loop control mode of operation in addition to the torque control value. The control torque combined with the torque control value serves as a torque setpoint value for the control element operating as a current regulator during the open-loop operation.

With the determined moment of inertia, the maximum possible change in speed or speed acceleration for accelerating and decelerating the electric motor may already be set directly after the transition from the closed-loop control mode of operation to the open-loop control mode of operation of the electric motor without the electric motor bucking or under- or overshooting. The electric motor can therefore be accelerated at the maximum permitted speed stroke from the closed-loop control mode of operation to the open-loop control mode of operation and conversely decelerated from the open-loop control mode of operation to the closed-loop operation. This enables undershoot-free and at the same time time-saving acceleration and deceleration of the electric motor.

Changing of a tool driven by the electric motor is advantageously signaled by a pulse inhibition which indicates that the electric motor is set to power-off and is therefore torque-free. The presence of a pulse inhibition is a criterion indicating that the tool has been swapped and consequently that a calculation based on a changed moment of inertia is necessary. Alternatively the pulse inhibition can be replaced for example by a manually actuatable switch, the switch being actuated at the time the tool is swapped.

The next time the electric motor is powered up, the electric motor is again initially accelerated with specification of the maximum moment of inertia in the pure closed-loop control mode of operation until the minimum speed is reached and in the subsequent open-loop control mode of operation can be accelerated further on the basis of the calculated moment of inertia at the maximum speed stroke up to the desired or predefined setpoint speed.

Accordingly, a method is provided which allows reliable, time-optimized and overshoot-free powering up of the electric motor in the sensorless mode of operation without data record switchover, even though the moment of inertia of the electric motor and its load may vary considerably. This method is simple to implement, since the determination of the speed and the torque in order to calculate the moment of inertia can be accomplished automatically by the already available motor model. A time-consuming and labor-intensive commissioning for a plurality of moments of inertia is unnecessary.

According to another aspect of the invention, a device for controlling a sensorless electric motor includes a measuring device measuring a motor current and a motor voltage, a functional module determining a speed and a torque as well as a moment of inertia of the electric motor from the measured motor current and from the measured motor voltage, an open-loop controller determining a torque control value from a speed deviation from a speed setpoint value, a pilot controller for generating a control torque s a function of the moment of inertia, and a control element which receives from the pilot controller as input variable a control torque generated from a predefined moment of inertia and which sets at least one of the motor current and the motor voltage in a open-loop control mode of operation of the electric motor, as long as the speed of the electric motor is below a minimum speed.

The open-loop controller determining a torque control value may be, for example, a PI torque controller.

A control torque is generated as a function of the moment of inertia by a pilot controller which supplies as input variable to a control element a control torque generated from a predefined moment of inertia and which sets the motor current or the motor voltage for an closed-loop control mode of operation of the electric motor if the speed of the sensorless electric motor falls below a minimum speed in the on/off duty or pilot control mode of operation.

Once the minimum speed is reached or exceeded, the control element receives as input variable for the open-loop control mode of operation of the electric motor a torque setpoint value which is formed from the torque control value of the controller (torque controller) and from a control torque of the pilot controller determined from the calculated moment of inertia. In order to determine the control torque the pilot controller appropriately receives motor-specific characteristic data in addition.

The device and the method are particularly suitable for controlling an electric motor of a machine tool drive in which tool changes are a routine part of operational requirements and lead to a change in the moment of inertia of the electric motor or of the drive.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows an open-loop and closed-loop control structure with functional modules of a device for controlling an electric motor of a machine tool drive according to the present invention.

DETAILED DESCRIPTION OF PREFERRED EMBODIMENTS

Turning now to the drawing, FIG. 1 shows a machine tool drive 1, also referred to hereinafter as a drive, with an electric motor 2 to which a first tool 4 and a second tool 5 can be coupled via a motor spindle 3 and thus be driven by the motor. An actuating element 6 serves in the manner of a current regulator for example in cooperative interaction with an inverter or converter (not shown in further detail) for generating a three-phase motor current IM which is measured by a measuring device 7 and routed together with a likewise recorded measured value of the motor voltage UM to a functional module 8.

A controller 9 disposed upstream of the control element 6 and preferably operating as a PI torque controller receives on the input side from a comparator element 10 an error variable $n_e$ as a speed deviation of a actual speed value $n_i$ from a speed setpoint value $n_s$. In the exemplary embodiment the speed setpoint value $n_s$ is supplied by a pilot controller 11 which on the output side supplies a control torque (pilot control torque) $M_V$ to a combinational element 12. The combinational element 12 combines the calculated control torque $M_{St}$ with a torque control value $M_R$ generated by the controller 9 to form a torque setpoint value $M_s$.

The torque setpoint value $M_s$ is supplied as input variable to the actuating element 6. The actuating element 6 is additionally supplied with the measured motor current $I_M$ as actual current value which is correctively adjusted to the current setpoint value derived from the torque setpoint value $M_s$. Accordingly the actuating element 6 also takes on or includes the function of a current regulator of the present open- and closed-loop control device.

Starting from a minimum speed which is equal for example to 10% of the rated speed of the electric motor 2, the electric motor 2 is driven in the sensorless open-loop operation. For this purpose the actual speed value $n_i$ is determined by the functional module 8 on the basis of the measured motor current $I_M$ and the measured motor voltage $U_M$. This results essentially from the voltage induced in the motor windings of the electric motor 2 or the induction voltage calculated by a motor model from the measured motor voltage $U_M$ reduced by a specific value.

With the aid of the motor model the torque M is also calculated by the functional module 8 as the quotient from the product of the induction voltage $U_{ind}$ determined from the measured motor voltage $U_m$ and the relevant component of the measured motor current $I_m$ as well as the actual speed value $n_i$. According to the relation $I_M \cos \phi$, the measured motor current $I_M$ is weighted with the cosine of the angle $\phi$ between the induced voltage or induction voltage $U_{ind}$ and the current space vector.

In addition the functional module 8, applying the relation $$J = \frac{M}{2\pi \cdot dn/dt}$$

where $M \cong (I_M \cos \phi) \cdot U_{ind}$, calculates the current moment of inertia $J_b$ of the machine tool drive 1, i.e. of the electric motor 2 including the motor spindle 3 and the tool 4 currently coupled thereto. On the basis of the moment of inertia $J_b$ the pilot controller 11 determines the control torque $M_{St}$. For this purpose motor-specific data or parameters $K_M$ are also made available to the pilot controller 11.

As a result of the combination of the torque control value $M_R$ generated by the controller 9 during the open-loop control mode of operation with the control torque $M_{St}$ generated on the part of the pilot controller 11 from the currently calculated moment of inertia $J_b$, the speed setpoint value $n_s$ also predefined as reference variable by a large speed stroke or a high change in frequency, and consequently a great acceleration of the electric motor 2, can be realized in a particularly short period of time. This also applies to the case in which the respective tool 4 or 5 is in engagement with the workpiece that is to be machined. For this purpose the torque setpoint value $M_s$ is formed from the combination of the torque control value $M_R$ with the control torque $M_{St}$ derived from the current moment of inertia $J_b$, such that the required motor current $I_M$ can be impressed into the electric motor 2 by the actuating element 6 operating as a current regulator.

Since the electric motor 2 is sensorless and information relating to the speed and the torque of the electric motor 2 is not available until the minimum speed is reached, the electric motor 2 is operated in a open-loop control mode below the minimum speed. This sensorless closed-loop control mode of operation takes place essentially when the electric motor 2 is started up from standstill, i.e. from its currentless power-off state, as well as always whenever a tool change is performed and for example the tool 4 is replaced by the tool 5. Since in this case it is usually different tools that are involved, for example a saw blade and a milling cutter having different masses and dimensions, such a tool change essentially also entails a change in the moment of inertia J of the machine tool drive 1 including the electric motor 2. The moment of inertia J can also change as a result of the machining of a workpiece by the respective tool 4, 5.

Such a change of tool can be preceded by the electric motor 2 being switched off, the switch-off taking the form, for example, of what is termed a pulse inhibition. Here, in the case of an inverter which is cooperatively interacting with the control element 6 and whose semiconductor switch connected in a bridge circuit is driven by pulse-width-modulated (PWM) signals generated by a processor, the inverter is blocked on the control side and consequently the electric motor 2 is switched to currentless (power off). The pulse inhibition in the course of a tool change can therefore be made available as a reset signal $S_R$ to the functional module 8. The latter thereupon provides a stored maximum moment of inertia $J_m$ to the pilot controller 11 instead of a calculated moment of inertia $J_b$.

By this means, in turn, the sensorless closed-loop control mode of operation of the electric motor 2 or of the machine tool drive 1 is initiated, the pilot controller 11 again determining a control torque $M_{St}$ on the basis of the predefined maximum moment of inertia $J_m$. Since no speed and torque information is available in this closed-loop operation, the control torque $M_{St}$ is the definitive input variable of the control element 6 and consequently the determining factor for the acceleration of the electric motor 2 until the minimum speed is reached.

Above the minimum speed the sensorless open-loop control mode of operation commences in that a comparatively large speed stroke or fast changes in frequency, and consequently high acceleration values of the electric motor 2, can be set based on the calculated current moment of inertia $J_b$.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method for controlling a sensorless electric motor, comprising:
   measuring a motor current and a motor voltage during a sensorless open-loop control mode of operation of the motor,
   determining a speed and a torque of the electric motor from the measured motor current and the measured motor voltage,
   computing a moment of inertia of the electric motor and determining a control torque from the calculated moment of inertia,
   associating the control torque with a torque control value determined by a controller from a speed deviation from a speed setpoint value, and
   supplying the control torque as a torque setpoint value to a control element for setting the motor current or the motor voltage,
   wherein during a sensorless open-loop control mode of operation the control element receives as input variable a control torque generated from a predefined moment of inertia, as long as the speed of the electric motor is below a minimum speed.

2. The method of claim 1, wherein the electric motor is a machine tool drive.

3. The method of claim 1, wherein in the open-loop control mode of operation of the electric motor, the control torque is determined from a stored moment of inertia and specified to the control element for setting at least one of the motor current and the motor voltage.

4. The method of claim 1, wherein in the open-loop control mode of operation of the electric motor, the control torque is determined from a maximum moment of inertia and specified to the control element for setting at least one of the motor current and the motor voltage.

5. The method of claim 3, wherein during the open-loop mode of operation, an actual speed value and an actual torque value are determined from the measured motor voltage and from the measured motor current.

6. The method of claim 5, wherein the determined actual speed value is compared with the speed setpoint value and the torque control value is formed from a speed deviation.

7. The method of claim 4, wherein the control element operating as a current regulator in the open-loop control mode of operation adjusts the motor current or the motor voltage based on a deviation of the motor current measured as the actual current value from the current setpoint value derived from the torque setpoint value.

8. A device for controlling a sensorless electric motor, comprising:
   a measuring device measuring a motor current and a motor voltage,
   a functional module determining a speed and a torque as well as a moment of inertia of the electric motor from the measured motor current and from the measured motor voltage,
   an open-loop controller determining a torque control value from a speed deviation from a speed setpoint value,
   a pilot controller for generating a control torque s a function of the moment of inertia, and
   a control element which receives from the pilot controller as input variable a control torque generated from a predefined moment of inertia and which sets at least one of the motor current and the motor voltage in a open-loop control mode of operation of the electric motor, as long as the speed of the electric motor is below a minimum speed.

9. The device of claim 8, wherein the control element receives as input variable a torque setpoint value formed from the torque control value of the open-loop controller and from a control torque of the pilot controller determined from the determined moment of inertia for an open-loop control mode of operation of the electric motor, when the speed of the electric motor exceeds the minimum speed.

10. The device of claim 8, wherein the pilot controller receives motor-specific characteristic data for determining the control torque.

11. A machine tool drive comprising an electric motor controlled by:
   measuring a motor current and a motor voltage during a sensorless open-loop control mode of operation of the motor,
   determining a speed and a torque of the electric motor from the measured motor current and the measured motor voltage,
   computing a moment of inertia of the electric motor and determining a control torque from the calculated moment of inertia,
   associating the control torque with a torque control value determined by a controller from a speed deviation from a speed setpoint value, and
   supplying the control torque as a torque setpoint value to a control element for setting the motor current or the motor voltage,
   wherein during a sensorless open-loop control mode of operation the control element receives as input variable a control torque generated from a predefined moment of inertia, as long as the speed of the electric motor is below a minimum speed.

12. A machine tool drive comprising a sensorless electric motor and having a device for controlling a sensorless electric motor, the device comprising:
   a measuring device measuring a motor current and a motor voltage,
   a functional module determining a speed and a torque as well as a moment of inertia of the electric motor from the measured motor current and from the measured motor voltage,
   an open-loop controller determining a torque control value from a speed deviation from a speed setpoint value,
   a pilot controller for generating a control torque s a function of the moment of inertia, and
   a control element which receives from the pilot controller as input variable a control torque generated from a predefined moment of inertia and which sets at least one of the motor current and the motor voltage in a open-loop control mode of operation of the electric motor, as long as the speed of the electric motor is below a minimum speed.

* * * * *